(12) United States Patent
Ghiasi (10) Patent No.: US 9,008,105 B2
(45) Date of Patent: Apr. 14, 2015

(54) SYSTEM AND METHOD FOR 10/40 GIGABIT ETHERNET MULTI-LANE GEARBOX

(71) Applicant: Broadcom Corporation, Irvine, CA (US)

(72) Inventor: Ali Ghiasi, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 168 days.

(21) Appl. No.: 13/853,356

(22) Filed: Mar. 29, 2013

(65) Prior Publication Data

US 2014/0286346 A1 Sep. 25, 2014

Related U.S. Application Data

(60) Provisional application No. 61/803,910, filed on Mar. 21, 2013.

(51) Int. Cl.
*H04L 12/28* (2006.01)
*H04L 12/773* (2013.01)

(52) U.S. Cl.
CPC ..................................... *H04L 45/60* (2013.01)

(58) Field of Classification Search
None
See application file for complete search history.

(56) References Cited

U.S. PATENT DOCUMENTS

| 8,326,157 | B2 * | 12/2012 | Cunningham et al. ........ 398/135 |
| 8,582,437 | B2 | 11/2013 | Ghiasi et al. |
| 2008/0205437 | A1 * | 8/2008 | Cole ............................. 370/464 |
| 2010/0158518 | A1 * | 6/2010 | Shin et al. ...................... 398/45 |

* cited by examiner

*Primary Examiner* — Afshawn Towfighi
(74) *Attorney, Agent, or Firm* — Duane S. Kobayashi (57) ABSTRACT

A system and method for 10/40 gigabit Ethernet multi-lane gearbox. In one embodiment, a gearbox device includes one or more inputs on a line side of the device, the one or more inputs being configured to receive four asynchronous 10 Gbit/s Ethernet channels, a marking module that is configured to insert virtual lane markers into four data flows at defined intervals to produce four marked data flows, and a 4:n physical media attachment (PMA) module that is configured to generate one or more higher-rate data flows based on the four marked data flows.

21 Claims, 8 Drawing Sheets

| 10 | $M_0$ | $M_1$ | $M_2$ | $BIP_3$ | $M_4$ | $M_5$ | $M_6$ | $BIP_7$ |
|---|---|---|---|---|---|---|---|---|
| 0 1 | 2  9 | 10  17 | 18  25 | 26  33 | 34  41 | 42  49 | 50  57 | 58  65 |

SYSTEM AND METHOD FOR 10/40 GIGABIT ETHERNET MULTI-LANE GEARBOX

This application claims priority to provisional application No. 61/803,910, filed Mar. 21, 2013, which is incorporated herein by reference in its entirety.

BACKGROUND

1. Field of the Invention

The present invention relates generally to networking and, more particularly, to a system and method for 10/40 gigabit Ethernet multi-lane gearbox.

2. Introduction

Increasing demands are being placed upon the data communications infrastructure. These increasing demands are driven by various factors, including the increasing bandwidth requirements of multimedia traffic. To accommodate the increasing bandwidth requirements, communication link speeds have also continued to evolve. Today, 10 Gigabit Ethernet (GbE) ports are commonly used. Management of today's networks will become increasingly important as network speeds continue to increase.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Network switches are being designed with ever increasing bandwidth. In one embodiment, switch bandwidth increases are enabled through an increase in the I/O speed. To improve I/O efficiency, it is envisioned that 20.625 Gbaud or 41.25 Gbaud signaling can be used. Indeed, it is a feature of the present invention that an efficient method is provided that can transport multiple streams of lower data rate over a narrower, but faster 40 Gbit/s pipe with an efficient method of fanning-out the bitrate data streams from the switch.

In one embodiment, a gearbox device includes one or more inputs on a line side of the device, the one or more inputs being configured to receive four asynchronous 10 Gbit/s Ethernet channels, a marking module that is configured to insert virtual lane markers into four data flows at defined intervals to produce four marked data flows, the four data flows being based on the received four asynchronous 10 Gbit/s Ethernet channels, a 4:n physical media attachment (PMA) module that is configured to generate one or more higher-rate data flows based on the four marked data flows, and one or more outputs on a system side of the device, the one or more outputs being configured to transmit the one or more higher-rate data flows onto physical media.

In various embodiments, the four 10 Gbit/s Ethernet channels can be received as 10GBASE-T signals, received as 10GBASE-KR signals, received as part of a 40 Gbit/s Attachment Unit Interface (XLAUI), received as part of a 40 Gbit/s Parallel Physical Interface (XLPPI), or the like. In various embodiments, the one or more higher-rate data flows can be transmitted on to optical media, copper media, or the like.

In one embodiment, the 4:n PMA module is a 4:2 PMA module, which generates two 20 Gbit/s data flows for transmission. In one example, the two 20 Gbit/s data flows can be transmitted using an Optical Internetworking Forum (OIF) 28G-SR/VSR link. In another embodiment, the 4:n PMA module is a 4:1 PMA module, which generates a single 40 Gbit/s data flow for transmission.

Figure 1:
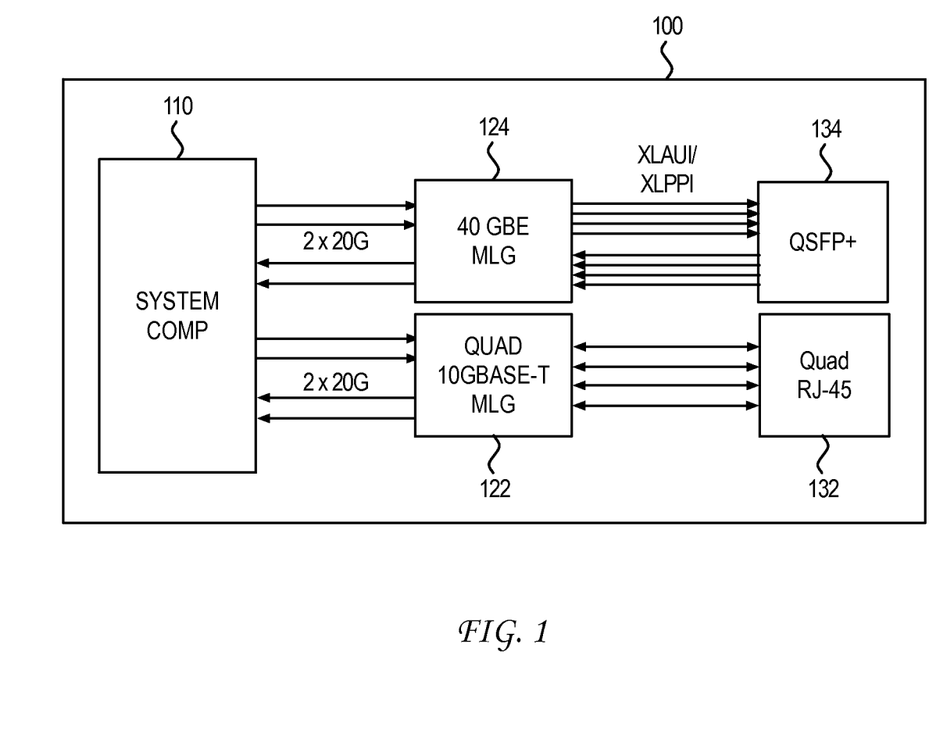
FIG. 1 illustrates an example application of a 40 gigabit Ethernet multi-lane gearbox.

To illustrate the various features of the present invention, reference is made first to FIG. 1, which illustrates a first example environment for use of a 40 GbE multi-lane gearbox (MLG). This first example environment is targeted for use of a 40 GbE MLG in line card 100. As illustrated, 40 GbE MLGs can be used to fan out from system component 110, wherein the system/controller I/O operates at a maximum operating speed (e.g., 20 G or 40 G) and supports a maximum number of 10 GbE data streams. In various examples, system component 110 can represent a switch component, a packet processor component, ASIC component, or the like.

In one example application, quad 10GBASE-T MLG 122 can be used to fan out four 10GBASE-T streams via quad RJ-45 ports 132. In the illustrated example, quad 10GBASE-T MLG 122 interfaces with system component 110 via two 20 G copper or optical links. In one example, quad 10GBASE-T MLG 122 is coupled to system component 110 via two OIF-28G-SR/VSR links. In general, the 40 GbE MLG has multi-purpose functionality. In another example application, 40 GbE MLG 124 can be used to interface to Quad Small Form-factor Pluggable Plus (QSFP+) transceiver 134 via an XLAUI/XLPPI interface. Again, in the illustrated example, 40 GbE MLG 124 interfaces with system component 110 via two 20 G copper or optical links.

As would be appreciated, the principles of the present invention are not dependent on the particular form of the link between the 40 GbE MLG and system component 110. In another example, the link between the 40 GbE MLG and system component 110 can be embodied as a 40 G link. In general, it is a feature of the present invention that the 40 GbE MLG can enable a maximum I/O operating speed while supporting a maximum number of 10 GbE data streams.

Figure 2:
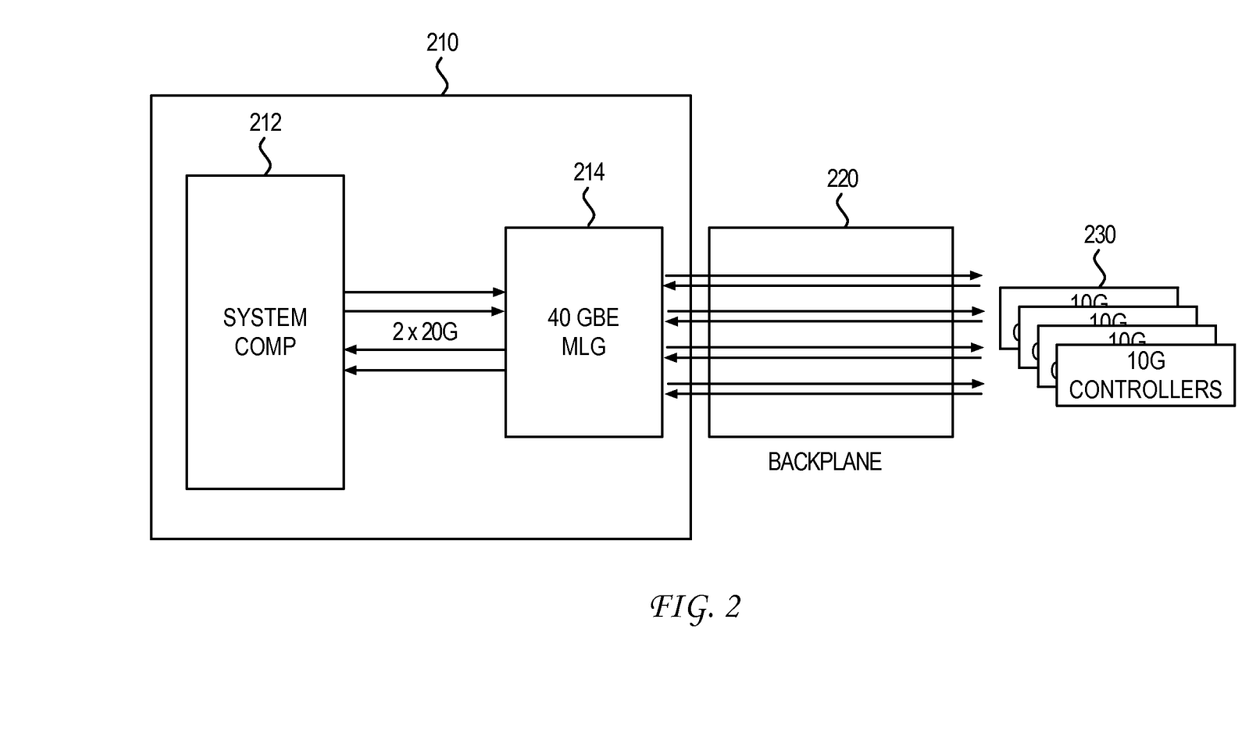
FIG. 2 illustrates a second example application of a 40 gigabit Ethernet multi-lane gearbox.

FIG. 2 illustrates a second example environment for use of a 40 GbE MLG. In this example blade-server environment, the 40 GbE MLG can be incorporated into fabric card 210. As illustrated, 40 GbE MLG 214 can be used to fan out from system component 212, wherein the system/controller I/O operates at a maximum operating speed (e.g., 20 G or 40 G) and supports a maximum number of 10 GbE data streams. Here, 40 GbE MLG 214 is coupled to a plurality of 10 G controllers 230 via backplane 220. In a similar manner to the example environment of FIG. 1, 40 GbE MLG 214 can interface with system component 212 via two 20 G links (e.g., copper or optical), and fans out four 10 G streams to 10 G controllers 230.

Figure 3:
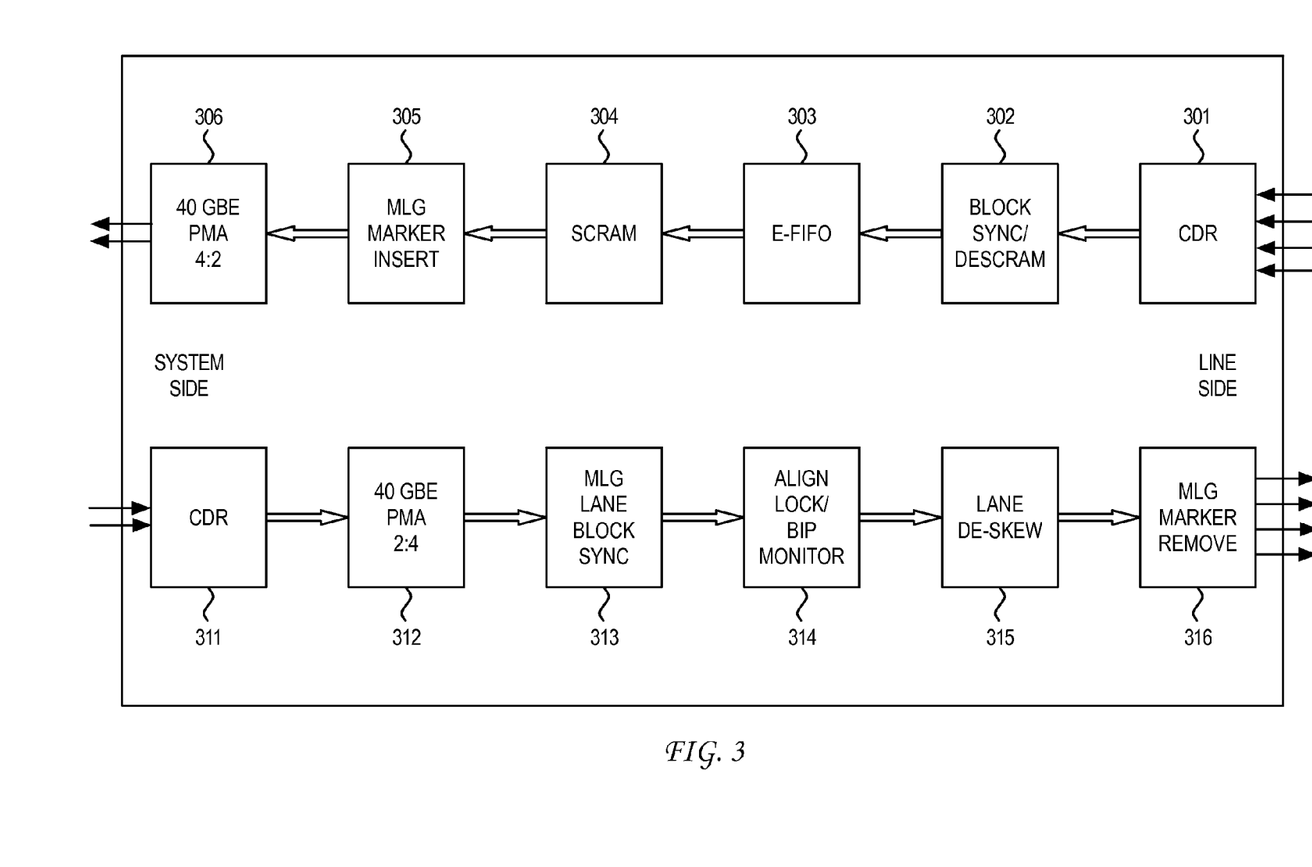
FIG. 3 illustrates an example embodiment of a 40 gigabit Ethernet multi-lane gearbox according to the present invention.

FIG. 3 illustrates an example embodiment of a 40 GbE MLG according to the present invention. As noted, the 40 GbE MLG can transport four asynchronous 10.3125 GBaud data streams through a gearbox and inverse gearbox. In the example embodiment illustrated, the 40 GbE MLG physical coding sublayer (PCS) can support 10 GbE as four virtual lanes. In various implementations, the serializer/deserializer (SerDes) interface can be based on four physical lanes operating at 10.3125 GBaud, two physical lanes operating at 20.625 Gbaud, or one physical lane operating at 41.25 GBaud.

In the present invention, each virtual lane can be an independent 10 GbE data stream having unique MLG lane markers similar to 40 GbE multi-lane distribution (MLD). It should be noted, however, that the 40 GbE MLD PCS only supports 40 GbE data traffic where all four lanes are synchronous and coming from the same source and going to the same destination. Here, it is recognized that a key drawback of 40 GbE MLD PCS is the lack of lower baudrate or allowing large switches to fan out 10 GbE from 20.625 GBaud or from 41.25 GBaud I/O.

As illustrated in the example embodiment, the line side of the device receives data at clock data recovery (CDR) 301 with each physical lane being a 10 GbE data stream. The received data then passes to Block Synchronization and Descrambling module 302, and then to E-FIFO 303, which is configured to bring the four asynchronous 10 GbE data streams to a common clock domain. The data is then scrambled by Scrambler module 304 and passed on to MLG Marker Insert module 305. MLG Marker Insert module 305 is generally configured to insert four unique MLG lane markers at set intervals replacing the Ethernet Idles. The marked data is then passed through 40 GbE 4:2 bit-multiplexed PMA 306 and output as two 20 G streams on the system side of the device.

In supporting four virtual lanes, a lane marker is inserted every 16383×66 bits, with each virtual lane having a unique lane marker. Ethernet Idles are replaced with the MLG lane markers, which thereby allows deterministic multiplexing and deterministic de-multiplexing. MLG lane markers allow the PCS at the destination to bit de-multiplex each 10 GbE stream and reassemble the Ethernet frame.

Figure 4:
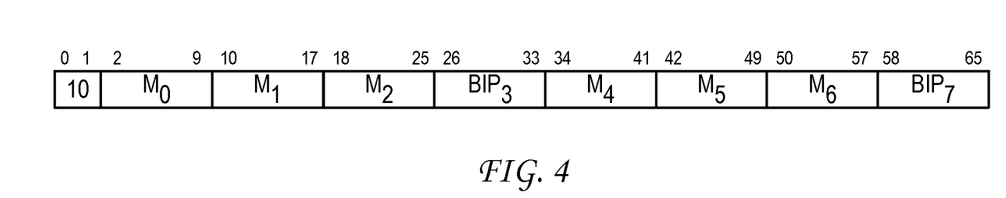
FIG. 4 illustrates an example embodiment of data flow marking using multi-lane gearbox lane markers.

Table 1 below shows an example of the MLG lane markers, which are arranged in the format illustrated in FIG. 4. Here, Bit Interleaved Parity (BIP) field $BIP_7$ is a bit-wise inversion of $BIP_3$.

TABLE 1

| MLG Lane Number | Encoding $(M_0, M_1, M_2, BIP_3, M_4, M_5, M_6, BIP_7)$ |
|---|---|
| 0.0 | 0x80, 0xB4, 0xAF, $BIP_3$, 0x7F, 0x4B, 0x50, $BIP_7$ |
| 1.0 | 0x11, 0x2A, 0xD8, $BIP_3$, 0xEE, 0xD5, 0x27, $BIP_7$ |
| 2.0 | 0x7C, 0x3F, 0x1C, $BIP_3$, 0x83, 0xC0, 0xE3, $BIP_7$ |
| 3.0 | 0xD1, 0x87, 0x25, $BIP_3$, 0x2E, 0x78, 0xDA, $BIP_7$ |

For the reverse direction, data is received on the system side of the device at CDR 311, then is delivered to 40 GbE 2:4 PMA 312. 40 GbE 2:4 PMA 312 is generally configured to bit-demultiplex the received data in producing four 10 GbE data streams. Next, the MLG data are lane block synchronized at MLG Lane Block Sync module 313, then passed to Alignment, Lock and BIP Monitor module 314 to determine the lock state. After the data achieves MLG lock state, lane de-skew is performed by Lane De-Skew module 315. Finally, the MLG lane markers are removed by MLG Marker Remove module 316 and replaced with standard Ethernet Idles. The four 10 GbE streams are then output on the line side of the device.

As illustrated, the example embodiment of FIG. 3 assumes a 4:2/2:4 40 GbE PMA. In another embodiment, the PMA can be replaced with a 1:4/4:1 40 GbE PMA, which would facilitate a 40 G system-side interface.

It should also be noted that the example embodiment of FIG. 3 is applied to 10 GbE streams. In general, the principles of the present invention can be applied to other data rates. For example, the principles of the present invention can be used to support 1 GbE data streams by allocating 40 MLG lane markers. As would be appreciated, the principles of the present invention can be applied to other ratios of input and output rates.

Figure 5A:
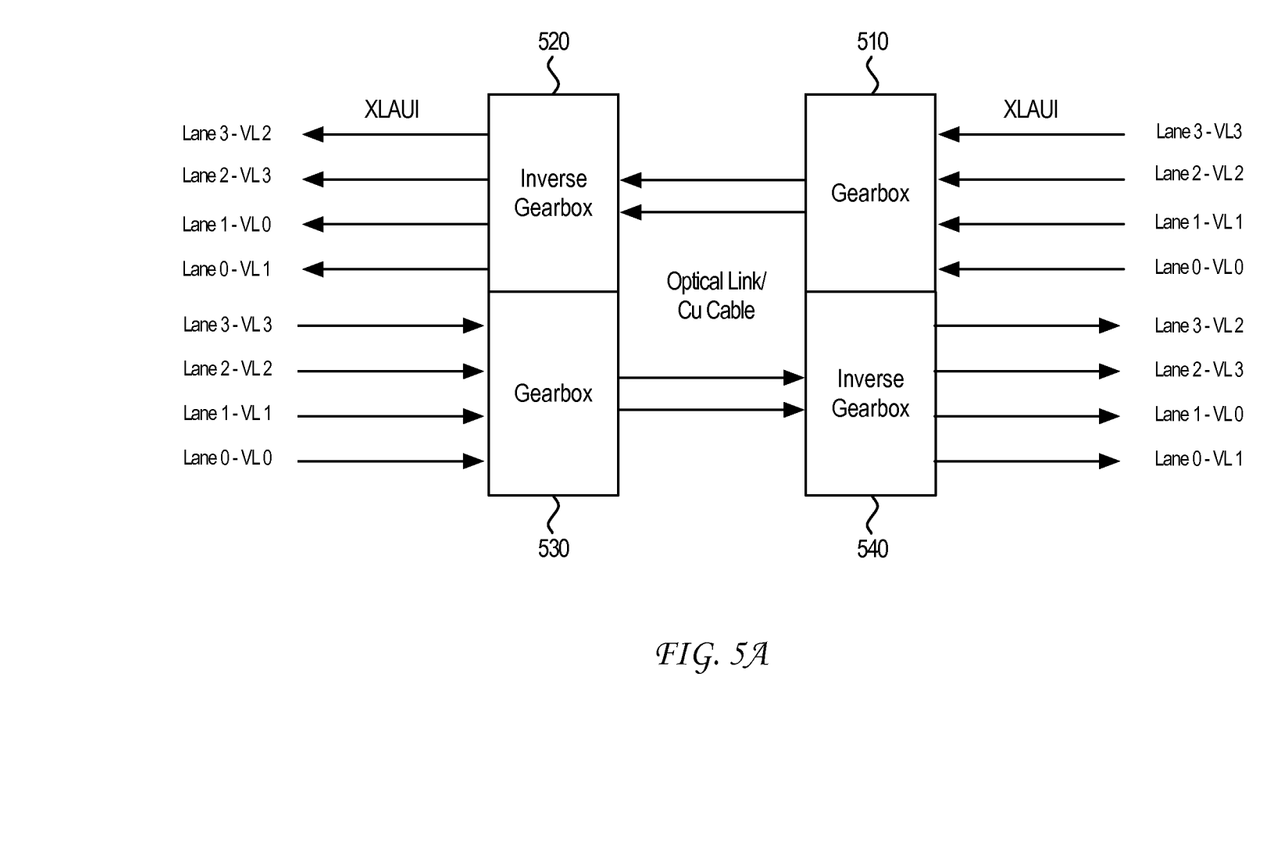
FIGS. 5A and 5B illustrate an example operation of cascaded gearbox and inverse gearbox functionality.
Figure 5B:
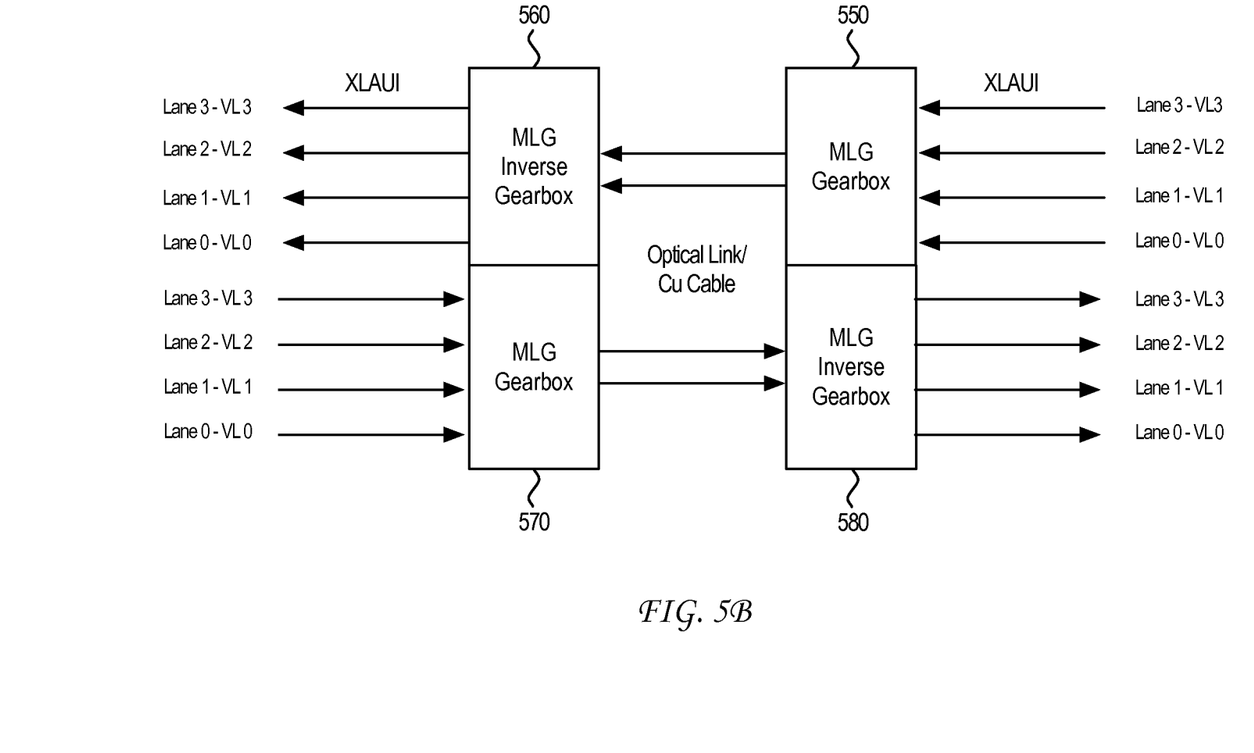

As described, the gearbox and inverse gearbox functions of the 40 GbE MLG enables a device to fan out data streams to independent ports. This functionality is enabled by the alignment of the virtual lanes with physical lanes. FIGS. 5A and 5B illustrate an example operation of cascaded gearbox and inverse gearbox functionality.

FIG. 5A illustrates an example operation of 40 GbE gearbox 510 cascaded with 40 GbE inverse gearbox 520 and 40 GbE gearbox 530 cascaded with 40 GbE inverse gearbox 540. As illustrated, 40 GbE gearbox 510 is coupled to 40 GbE inverse gearbox 520 via an optical or copper link. Similarly, 40 GbE gearbox 530 is coupled to 40 GbE inverse gearbox 540 via the optical or copper link. In cascaded form, the gearboxes and inverse gearboxes serve to facilitate communication of four lanes of 10.3125 Gbaud traffic as a 40 GbE link.

FIG. 5A illustrates the lack of correspondence between virtual lane traffic and physical lanes that can result from the use of conventional MLD virtual lane markers. As illustrated in the upper right hand portion of FIG. 5A, VLs 0 to 3 are traveling on physical lanes 0-3, respectively. Upon traversal through 40 GbE gearbox 510 and 40 GbE inverse gearbox 520, however, the outputs from 40 GbE inverse gearbox 520 are virtual lanes that are not associated with specific physical lanes. For example, VL 0 is now output by 40 GbE inverse gearbox 520 onto physical lane 1, and VL 3 is now output by 40 GbE inverse gearbox 520 onto physical lane 2.

FIG. 5B illustrates the ability of the 40 GbE MLG gearbox to align virtual lanes to physical lanes and reassemble each of the 10 GbE data streams. As illustrated, 40 GbE MLG gearbox 550 is cascaded with 40 GbE MLG inverse gearbox 560, and 40 GbE MLG gearbox 570 is cascaded with 40 GbE MLG inverse gearbox 580. Whereas the MLD implementation yielded a lack of correspondence between virtual lane traffic and physical lanes, the MLG implementation retains such correspondence. For example, VL 0 is now output by 40 GbE MLG inverse gearbox 560 onto physical lane 0, and VL 3 is now output by 40 GbE MLG inverse gearbox 560 onto physical lane 3.

In one embodiment, the alignment mechanism can be embodied as a light PCS element that does not add significant amounts of delay. Effectively, the light PCS element can be configured to identify the MLG lane markers in the four data flows and use such an identification to associate the correct data flows to particular physical lanes. As would be appreciated, the particular mechanism used to effect such an alignment based on the MLG lane markers would be implementation dependent. In one example, the identification of the MLG lane markers is used to generate a control signal that can controls multiplexing and de-multiplexing elements.

Figure 6:
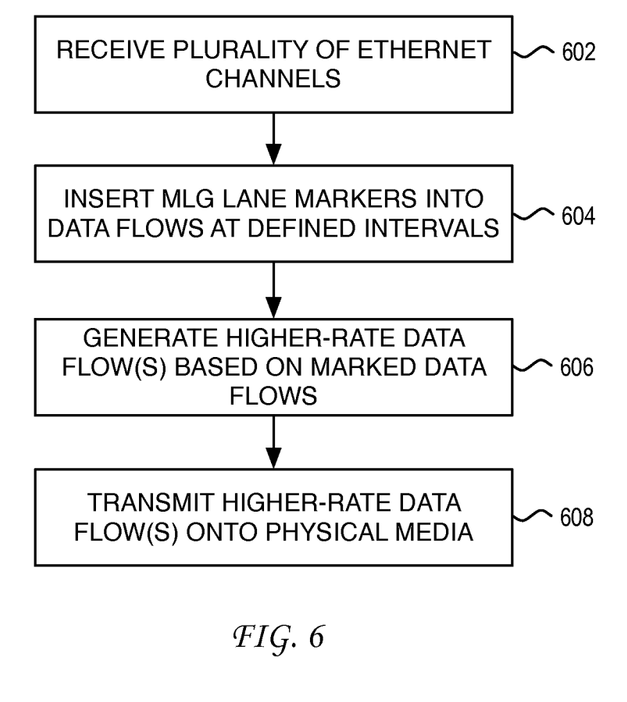
FIG. 6 illustrates an example flowchart of a gearbox process of the present invention.

FIG. 6 illustrates a flowchart of a gearbox process of the present invention. As illustrated, the process begins at step 602 where a plurality of channels are received in an MLG device. In one example, these channels can be asynchronous channels (e.g., independent 10GBASE-T channels) received at a line side of the MLG device. Next, at step 604, MLG lane markers are inserted into the received data flows at defined intervals. The marked data flows are then multiplexed into one or more higher-rate data flow(s) at step 606. For example, four marked 10 G data flows can be multiplexed into two 20 G data flows, four marked 10 G data flows can be multiplexed into one 40 G data flows, 40 marked 1 G data flows can be multiplexed into two 20 G data flows, 40 marked 1 G data flows can be multiplexed into one 40 G data flow, etc. The higher-rate data flow(s) are then transmitted onto physical media (e.g., copper, optical, etc.) at step 608. As would be appreciated, various rations of marked data flows to higher-rate data flow(s) can be used without departing from the scope of the present invention.

Figure 7:
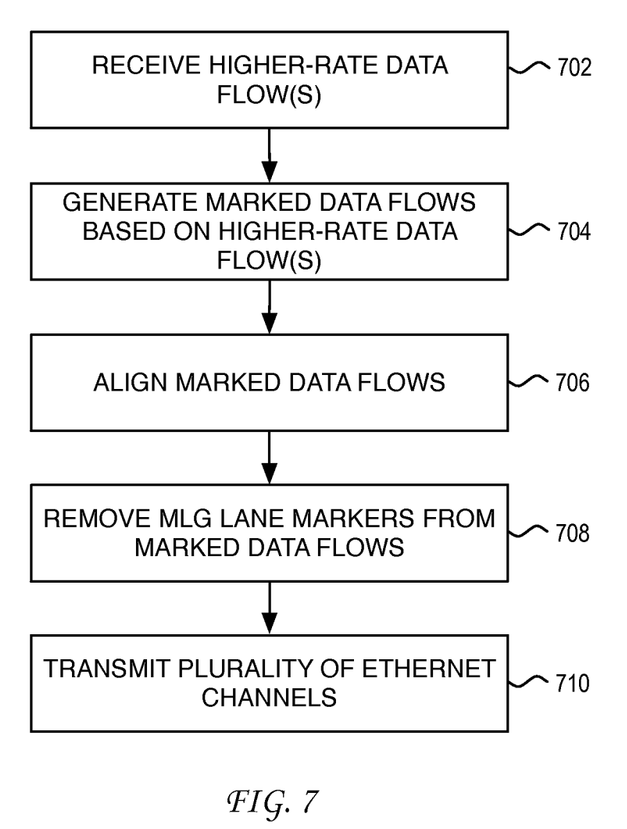
FIG. 7 illustrates an example flowchart of an inverse gearbox process of the present invention.

FIG. 7 illustrates a flowchart of an inverse gearbox process of the present invention. As illustrated, the process begins at step 702 where one or more higher-rate data flows are received in an inverse MLG device. Next, at step 704, the higher-rate data flows are de-multiplexed into individual marked data flows. For example, four marked 10 G data flows can be identified and de-multiplexed from two 20 G data flows, four marked 10 G data flows can be identified and de-multiplexed from one 40 G data flows, 40 marked 1 G data flows can be identified and de-multiplexed from two 20 G data flows, 40 marked 1 G data flows can be identified and de-multiplexed from one 40 G data flow, etc. At step 706, the marked data flows are then aligned based on the MLG lane markers such that marked data flows can be output on associated physical lanes. At step 708, the MLG lane markers are removed from the marked data flows prior to the transmission of a plurality of Ethernet channels at step 710.

In the description of the flowcharts provided above, it should be noted that the illustrated steps need not be performed in their listed order except where explicitly specified. As such, various steps in the process can be performed concurrently or in an order different from that illustrated.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered as exclusive of these other embodiments. Also, it is to be understood that the phraseology and terminology employed herein are for the purposes of description and should not be regarded as limiting.

What is claimed is:

1. A device, comprising:
one or more inputs on a line side of the device, the one or more inputs configured to receive four asynchronous 10 Gbit/s Ethernet channels;
a marking module configured to insert virtual lane markers into four data flows at defined intervals to produce four marked data flows, the four data flows based on the received four asynchronous 10 Gbit/s Ethernet channels;
a 4:2 physical media attachment module configured to generate two 20 Gbit/s data flows based on the four marked data flows; and
two outputs on a system side of the device, the two outputs configured to transmit the two 20 Gbit/s data flows onto optical media.

2. The device of claim 1, wherein the four 10 Gbit/s Ethernet channels are received as 10GBASE-T signals.

3. The device of claim 1, wherein the four 10 Gbit/s Ethernet channels are received as 10GBASE-KR signals.

4. The device of claim 1, wherein the four 10 Gbit/s Ethernet channels are received as part of a 40 Gbit/s Attachment Unit Interface (XLAUI).

5. The device of claim 1, wherein the four 10 Gbit/s Ethernet channels are received as part of a 40 Gbit/s Parallel Physical Interface (XLPPI).

6. The device of claim 1, further comprising a block synchronization and descrambling module, a FIFO module for bringing the four data flows into a common clock domain, and a scrambling module.

7. The device of claim 1, wherein the virtual lane markers are defined by the following:

| Lane Number | Encoding ($M_0$, $M_1$, $M_2$, $BIP_3$, $M_4$, $M_5$, $M_6$, $BIP_7$) |
| --- | --- |
| 0.0 | 0x80, 0xB4, 0xAF, $BIP_3$, 0x7F, 0x4B, 0x50, $BIP_7$ |
| 1.0 | 0x11, 0x2A, 0xD8, $BIP_3$, 0xEE, 0xD5, 0x27, $BIP_7$ |
| 2.0 | 0x7C, 0x3F, 0x1C, $BIP_3$, 0x83, 0xC0, 0xE3, $BIP_7$ |
| 3.0 | 0xD1, 0x87, 0x25, $BIP_3$, 0x2E, 0x78, 0xDA, $BIP_7$ |

8. The device of claim 1, further comprising:
one or more inputs on the system side of the device, the one or more input configured to receive two 20 Gbit/s data flows from the optical media;
a 2:4 physical media attachment module configured to generate four marked data flows based on the two 20 Gbit/s data flows;
an alignment module configured to align the four marked data flows with physical lanes;
a marking removal module configured to remove virtual lane markers inserted into the four marked data flows at defined intervals; and
one or more outputs on the line side of the device, the one or more outputs configured to transmit four 10 Gbit/s Ethernet channels.

9. A device, comprising:
one or more inputs on a line side of the device, the one or more inputs configured to receive four asynchronous 10 Gbit/s Ethernet channels;
a marking module configured to insert virtual lane markers into four data flows at defined intervals to produce four marked data flows, the four data flows based on the received four asynchronous 10 Gbit/s Ethernet channels;

a 4:2 physical media attachment module configured to generate two 20 Gbit/s data flows based on the four marked data flows; and two outputs on a system side of the device, the two outputs configured to transmit the two 20 Gbit/s data flows onto copper media.

10. A method, comprising:

receiving four 10 Gbit/s Ethernet channels via 10GBASE-T or 10GBASE-KR signals;

inserting virtual lane markers into four data flows at defined intervals to produce four marked data flows, the four data flows based on the received four 10 Gbit/s Ethernet channels;

generating two 20 Gbit/s data flows based on the four marked data flows; and transmitting the two 20 Gbit/s data flows onto physical media.

11. The method of claim 10, wherein the physical media is optical media.

12. The method of claim 10, wherein the physical media is copper media.

13. A method, comprising:

receiving four 10 Gbit/s Ethernet channels via a 40 Gbit/s Attachment Unit Interface (XLAUI) or a 40 Gbit/s Parallel Physical Interface (XLPPI);

inserting virtual lane markers into four data flows at defined intervals to produce four marked data flows, the four data flows based on the received four 10 Gbit/s Ethernet channels;

generating two 20 Gbit/s data flows based on the four marked data flows; and transmitting the two 20 Gbit/s data flows onto physical media.

14. The method of claim 13, wherein the physical media is optical media.

15. The method of claim 13, wherein the physical media is copper media.

16. A network device, comprising:

one or more inputs on a line side of the device, the one or more inputs configured to receive four 10 Gbit/s Ethernet channels via 10GBASE-T signals or 10GBASE-KR signals;

a marking module configured to insert virtual lane markers into four data flows at defined intervals to produce four marked data flows, the four data flows based on the received four 10 Gbit/s Ethernet channels;

a 4:1 physical media attachment module configured to generate a 40 Gbit/s data flow based on the four marked data flows; and an output on a system side of the device, the output configured to transmit the 40 Gbit/s data flow onto physical media.

17. The device of claim 16, wherein the physical media is optical media.

18. The device of claim 16, wherein the physical media is copper media.

19. A device, comprising:

one or more inputs on a line side of the device, the one or more inputs configured to receive four 10 Gbit/s Ethernet channels via a 40 Gbit/s Attachment Unit Interface (XLAUI) or a 40 Gbit/s Parallel Physical Interface (XLPPI);

a marking module configured to insert virtual lane markers into four data flows at defined intervals to produce four marked data flows, the four data flows based on the received four 10 Gbit/s Ethernet channels;

a 4:1 physical media attachment module configured to generate a 40 Gbit/s data flow based on the four marked data flows; and an output on a system side of the device, the output configured to transmit the 40 Gbit/s data flow onto physical media.

20. The device of claim 19, wherein the physical media is optical media.

21. The device of claim 19, wherein the physical media is copper media.

* * * * *